United States Patent
Adami

[11] Patent Number: 6,092,452
[45] Date of Patent: Jul. 25, 2000

[54] DEVICE FOR LENGTHWISE SLITTING A WEB AND METHOD RELATING THERETO

[75] Inventor: Mauro Adami, Lucca, Italy

[73] Assignee: Fosber S.p.A., Lucca, Italy

[21] Appl. No.: 09/124,017

[22] Filed: Jul. 29, 1998

[30] Foreign Application Priority Data

Jul. 31, 1997 [IT] Italy .................... FI97A0190

[51] Int. Cl.[7] .................................... B26D 7/06
[52] U.S. Cl. ................... 83/428; 83/13; 83/102; 83/425.1; 83/425.2; 83/425.4; 83/508.2; 83/495; 83/676
[58] Field of Search ................ 83/13, 169, 174, 83/405, 498, 499, 500, 501, 504, 505, 508.2, 508.3, 676, 425.4, 562, 428, 102, 865, 863

[56] References Cited

U.S. PATENT DOCUMENTS

| | | | |
|---|---|---|---|
| 3,691,887 | 9/1972 | Roch | 83/277 X |
| 3,757,645 | 9/1973 | Roch | 91/411 R X |
| 3,763,748 | 10/1973 | Gallager, Jr. | 93/36 M X |
| 4,715,254 | 12/1987 | DeGan | 83/169 X |
| 4,813,319 | 3/1989 | Weyand, Jr. | 83/22 X |
| 4,967,963 | 11/1990 | Brown | 239/424.5 X |
| 5,197,366 | 3/1993 | Paulson et al. | 83/498 X |
| 5,203,246 | 4/1993 | Smitterberg et al. | 83/420 X |
| 5,209,150 | 5/1993 | Arconada Arconada | 83/174 X |
| 5,393,294 | 2/1995 | Jobst . | |
| 5,406,869 | 4/1995 | Prochnow et al. | 83/22 X |
| 5,435,217 | 7/1995 | Kato et al. | 83/100 X |
| 5,483,856 | 1/1996 | Smitterberg et al. | 83/23 X |
| 5,551,328 | 9/1996 | Hsu | 83/508.3 X |
| 5,626,065 | 5/1997 | Cattini | 83/174 |
| 5,660,095 | 8/1997 | Smitterberg et al. | 83/820 |
| 5,761,980 | 6/1998 | Ima et al. | 83/500 |
| 5,918,519 | 7/1999 | Schnabel et al. . | |

FOREIGN PATENT DOCUMENTS 0 570 858   11/1993   European Pat. Off. .

Primary Examiner—Jessica J. Harrison
Assistant Examiner—Binh-An Nguyen
Attorney, Agent, or Firm—Breiner & Breiner

[57] ABSTRACT

A method is described for changing between jobs in a device for slitting a web (N) into a plurality of lengthwise strips (L1, L3, L5, L1', L3', L5') with two series of slitting tools (25, 25B). At the moment of the job changeover, the tools of a first series are moved from a slitting position to an inactive position and the tools of the second series are moved from an inactive position to a slitting position. The passage from one position to the other is delayed for one of the tools of each series in order to generate two slit lines (L3', L5) extending into the job changeover zone (CA), and these lines are subsequently joined up by a transverse slit (L9). (FIG. 6)

12 Claims, 6 Drawing Sheets

DEVICE FOR LENGTHWISE SLITTING A WEB AND METHOD RELATING THERETO

DESCRIPTION

1. Technical Field

This invention relates to a device for slitting a continuous web, such as a web of corrugated board, for example.

More specifically the present invention relates to a device for slitting a continuous web, of the type that comprises at least two series of slitting tools in which one series of tools is active while the other is temporarily inactive.

The invention also relates to a slitter/scorer machine comprising a slitting station with a slitting device of the abovementioned type, as well as to a method for changing between jobs during the slitting of a web.

2. Background Art

The corrugated board manufacturing and converting industry employs machines known as slitter/scorers that slit a web of continuous material into a plurality of strips of smaller width than the width of the web, and that also produce score lines on said strips, that is to say lines preparatory to the subsequent folding of the material.

Examples of such machines are disclosed in U.S. Pat. No. 5,406,869, U.S. Pat No. 5,090,281 and EP-B-0,692,369.

In the manufacture of sheets of board slit and scored from continuous webs, the format and therefore the position of the slit lines and score lines has to be changed frequently, since the machinery does different jobs requiring different sheets in rapid succession. It is for this reason that slitter/scorer machines with two in-line series of scoring tools and two in-line series of slitting tools are used. This makes it possible to process one sheet job on one series of scoring tools and slitting tools, while the other series of scoring and slitting tools is positioned by robots for the processing of the following job.

The lengthwise strips of web produced by slitting it are conveyed in certain cases to two separate transverse shears that generate sheets from the web by cutting said strips transversely. The two shears are at two different heights. One of the lengthwise slit lines cut into the web separates it in this case into two portions which are carried along different paths at different levels. In these cases certain problems occur in the job changeover zone. Specifically, in this zone the lengthwise slit line dividing the two portions of web for conveyance to the two separate levels is normally displaced transversely, the position of the line being changed between the old job and the new one.

If special precautions are not taken, the web can be torn in the transition zone between the old and the new jobs. The problems that occur in this case and certain possible solutions are described in detail in EP-A-0458340, EP-B-0468374, EP-B-0534177, U.S. Pat. No. 5,496,431 and EP-A-0737553.

FIGS. 1 and 2 show two different ways of switching from a previous job to the next job in a slitter/scorer machine. Referring initially to FIG. 1, the general reference N denotes the web, which is slit along a series of lengthwise slit lines L1, L3, L5. In the example depicted the score lines are omitted to keep the drawing clear, and also because the present invention can also be carried out in the absence of scoring. The slit lines L1 generate two lateral trimmings R which are later removed, while slit lines L3 and L5 generate three strips S1, S2, S3 of differing widths, which are conveyed in a manner known per se toward two separate paths. For example, strips S1, S2 can be conveyed toward an upper level through a first shear, while strip S3 is conveyed to a lower second level where a second shear is located.

C—C denotes a section in which the job changeover takes place. Upstream of said section the slit lines, marked L1', L3', L5', are displaced with respect to the lines L1, L3, L5 and define two lateral trimmings R' and three strips S1', S2', S3' whose widths differ from those of strips S1, S2, S3. Strip S1' is conveyed to the upper level and strips S2' and S3' are conveyed to the lower level. T7 denotes two short lateral incisions that separate trimmings R from trimmings R', while L9 is a transverse joining slit line, perpendicular to the direction of forward travel F of the web N. The length of the transverse joining slit L9 is such as to join up slit lines L5 and L3' which divide the strips conveyed to the upper level from those conveyed to the lower level. As in the prior art (cp. the publications cited above), the transverse joining slit L9 allows the lengthwise strips S to diverge on separate paths without tearing of the web.

In certain situations, however (such as that shown in FIG. 1), two strips S2 and S2' are generated by slit L9 to give a tail edge and a leading edge that are completely free and therefore difficult to guide along the machine, which means there is a risk of the web shifting out of true.

To prevent the generation of strips with free edges (both leading and tail), it is prior art (see FIG. 2 and EP-A-0737553) to create an inclined joining slit L9' that joins up slit lines L5 and L3'. As FIG. 2 makes clear, in this method none of the strips S1, S2, S3, S1', S2', S3' is slit completely through; strips S1', S2', S3' all remain joined to strips S1, S2, S3 which precede them. However, this approach requires the use of sophisticated slitting systems. In particular the preference is to use nozzles emitting pressurized water, but these need frequent maintenance.

OBJECTS OF THE INVENTION

It is an object of the invention to provide a slitting device, in particular but not exclusively intended for a slitter/scorer machine, that overcomes the disadvantages of conventional devices.

More particularly, it is an object of the present invention to provide a simple, inexpensive device requiring little maintenance and capable of avoiding the complete transverse slitting of strips in the web in the job changeover zone.

A further object of the present invention is to provide a method for switching from a preceding job to a following job in a slitting machine or slitting and scoring machine comprising two series of slitting tools, in which it is possible to maintain control of the strips into which the web is slit without said strips having the complete transverse slit, and which is very simple and reliable.

SUMMARY OF THE INVENTION

These and other objects and advantages, which will be clear to those skilled in the art from the following text, are achieved starting from a web slitting device comprising:

a first and a second series of slitting tools for slitting said web along lengthwise slit lines;

control means for moving the slitting tools of said two series of tools alternately between a slitting position and an inactive position, the tools of one series being in the slitting position while the tools of the other series are in the inactive position, and vice versa;

and an auxiliary slitting means for generating a joining slit not parallel to the direction of forward travel of the web in a job changeover zone.

Characteristically, according to the invention, at least some of the slitting tools of the first and second series of slitting tools can be moved from said slitting position to said inactive position, and vice versa, independently of the other tools of the same series. In addition, on the occasion of the change of job the control means delay the passage of one slitting tool, belonging to the series of tools temporarily in the slitting position, from said slitting position to the inactive position, and bring forward the passage of one slitting tool, belonging to the series of tools temporarily in the inactive position, from the inactive position to the slitting position, in order in said job changeover zone to extend a lengthwise slit line from the previous job and a lengthwise slit line for the job following. The auxiliary slitting means joins up the two extended slit lines in the job changeover zone by means of a joining slit.

It should be understood, as will become clear in the course of the text, that the joining slit may be made upstream or downstream of the slitting tools.

In practice, therefore, according to the invention, on the occasion of the job changeover, the tool which in the previous job was generating the lengthwise slit line separating the strips that will go onto the upper level from those which will go onto the lower level, is moved into the inactive position slightly after the other tools. In a corresponding manner, the tool of the other series, which in the job following is to generate the lengthwise slit line that will separate the strips conveyed to the two separate levels, becomes active earlier than the other slitting tools. The effect of this is to create a job changeover zone in which there are no lengthwise slit lines, with the sole exception of two slit lines (one from the preceding job and one from the job following) corresponding to the line separating the strips into the two levels. These two lines extend into the job changeover zone to where they can be connected by a joining slit that may actually be perpendicular to the direction of forward travel of the web. This perpendicular slit may easily be produced by a mechanical system without requiring a water nozzle or other complex means. As will become clear below, this still provides the advantage that none of the lengthwise strips into which the web is divided is completely interrupted.

It is not necessary for all the tools of both series to be controllable independently of one another: instead, it is sufficient, for the purposes of the invention, that those tools that are to generate the slit line separating the strips of web that are to be conveyed at different levels should be independently controllable. However, because it is not always possible to decide in advance where this line will be, and therefore which tools in a particular case can be used to generate this line, it is particularly advantageous for all the tools of both series to be independently controllable.

Other advantageous features and embodiments of the device and method according to the invention are indicated in the accompanying claims.

BRIEF DESCRIPTION OF THE DRAWINGS

A clearer understanding of the invention will be obtained by following the description and accompanying drawing, which latter shows a practical, non-restrictive example of an embodiment of the invention. In the drawing.

DETAILED DESCRIPTION OF THE PREFERRED EMBODIMENT OF THE INVENTION

Figure 3:
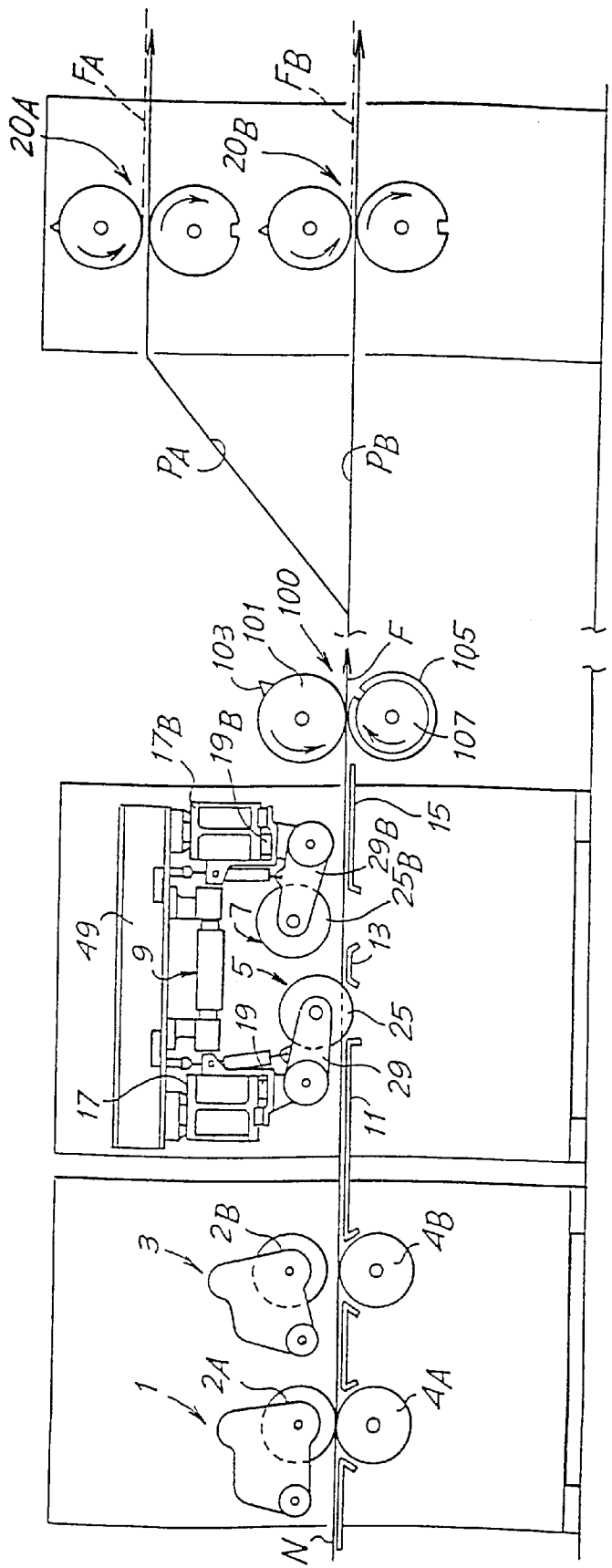
FIG. 3 schematically shows a slitter/scorer machine to which the present invention is applied.

Shown generically in FIG. 3 is the structure of a machine for slitting and scoring a web N coming from, say, a corrugated board production line. The machine comprises a first scoring station 1, a second scoring station 3, a first slitting station 5 and a second slitting station 7. The four stations may be arranged in a variety of different ways and in the example illustrated the two scoring stations are located upstream of the slitting stations, but this is not obligatory. Arrangements in which the scoring and slitting stations are arranged alternately are also possible.

The invention will be described below with reference to a complex machine fitted additionally with scoring tools, but it will be understood that the invention can also be applied to different kinds of machines, e.g. without scoring tools.

In the position shown in FIG. 3, the scoring tools of station 1, denoted 2A, 4A, are active, while those of station 3, denoted 2B, 4B, are disengaged from the web N and can be positioned by a positioning robot (not shown). The slitting tools of station 7 are inactive and can be positioned by the positioning robot, general reference 9, while those of station 5 are active.

The two slitting stations 5 and 7 are essentially symmetrical and their component parts are therefore basically the same. The following description will describe station 5 in detail. Identical or corresponding parts also found in station 7 are denoted by the same reference numerals followed by the letter "B".

P denotes the path of the web N, which runs on travel surfaces 11, 13, 15 as it passes through the slitting stations 5, 7.

Slitting station 5 comprises a crossbeam 17 attached to the underside of which is a track 19 running transversely to the direction F of forward travel of the web. A plurality of slitting units 21, one of which is visible in longitudinal section on a vertical plane in FIG. 3, travels along the track 19, while three separate slitting units 21, some of which are partly sectioned on a horizontal plane, are visible in FIG. 5.

Passing through the various slitting units 21 is a driving shaft 23 providing power to the various slitting tools of the slitting units 21. Each slitting tool, marked 25, is mounted on a spindle 27 supported at the end of an arm 29 that pivots about the axis A—A of the driving shaft 23. The tool turns anticlockwise, in the example, and has a peripheral speed of typically 3–4 times the forward travel speed of the web N.

The spindle 27 takes its power from an intermediate drive comprising a belt 31 running around a first pulley 33 torsionally connected to the driving shaft 23, but able to move axially along it, and a second pulley 35 mounted on the spindle 27.

Figure 5:
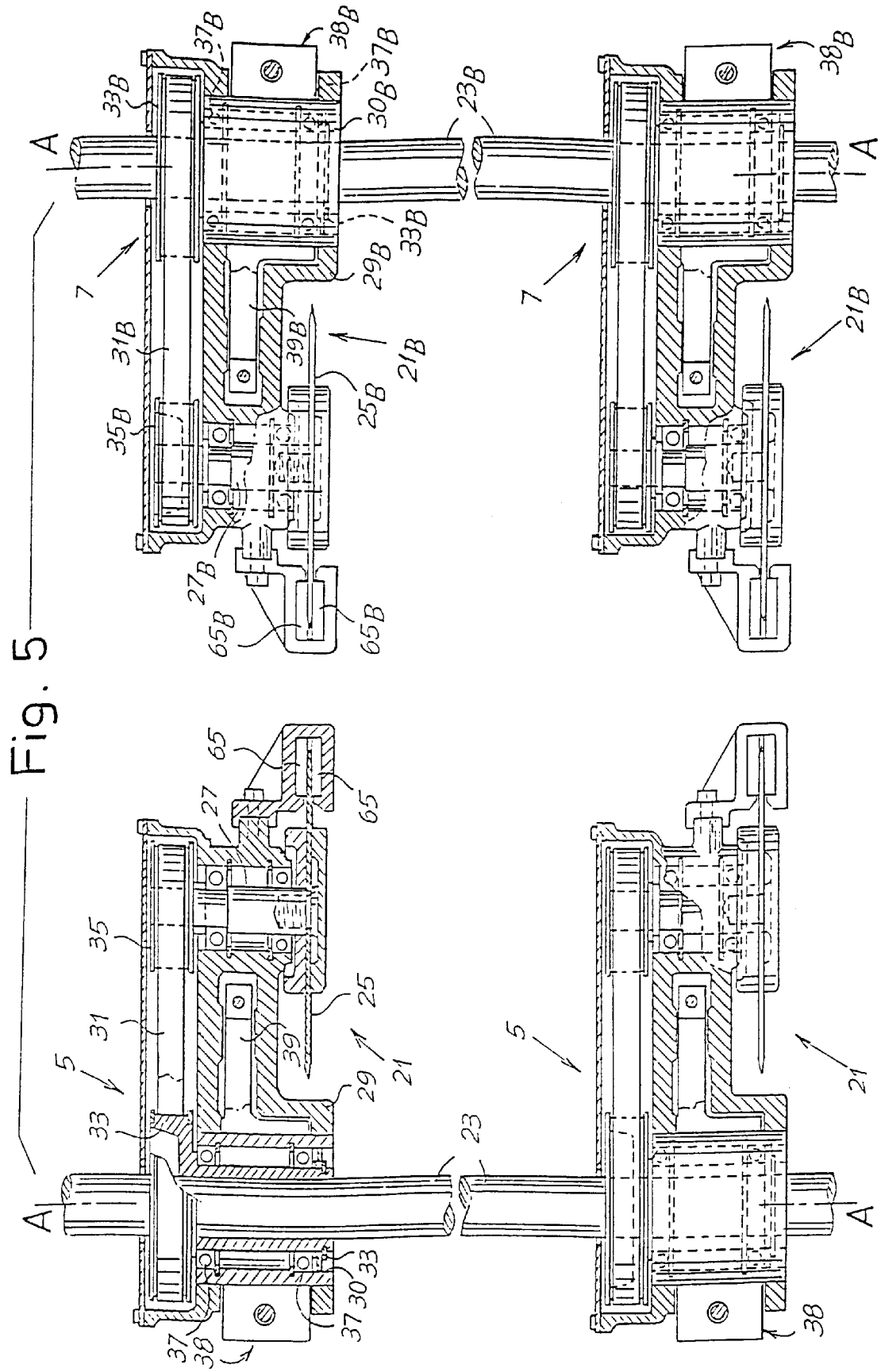
FIG. 5 schematically shows a view from above of a number of slitting tools belonging to both stations.

The pivoting arm 29 (cp. FIG. 5) is supported on a sleeve 30 allowing it to pivot about the axis A—A relative to a moving bracket 38 that can travel along the track 19. The moving bracket 38 is clamped to the sleeve 30 so as not to pivot with respect to it, and has an extension 39 extending inside the pivoting arm 29 (cp. FIG. 5) and forming a bearing surface for an adjustable stop 41 fixed to the pivoting arm 29. In the example illustrated the stop 41 is a threaded pin for adjusting the position adopted by the pivoting arm 29 when the stop 41 bears against the extension 39. The sleeve 30 contains bearings 37 for supporting the pulley 33, which in turn supports the driving shaft 23.

Figure 4:
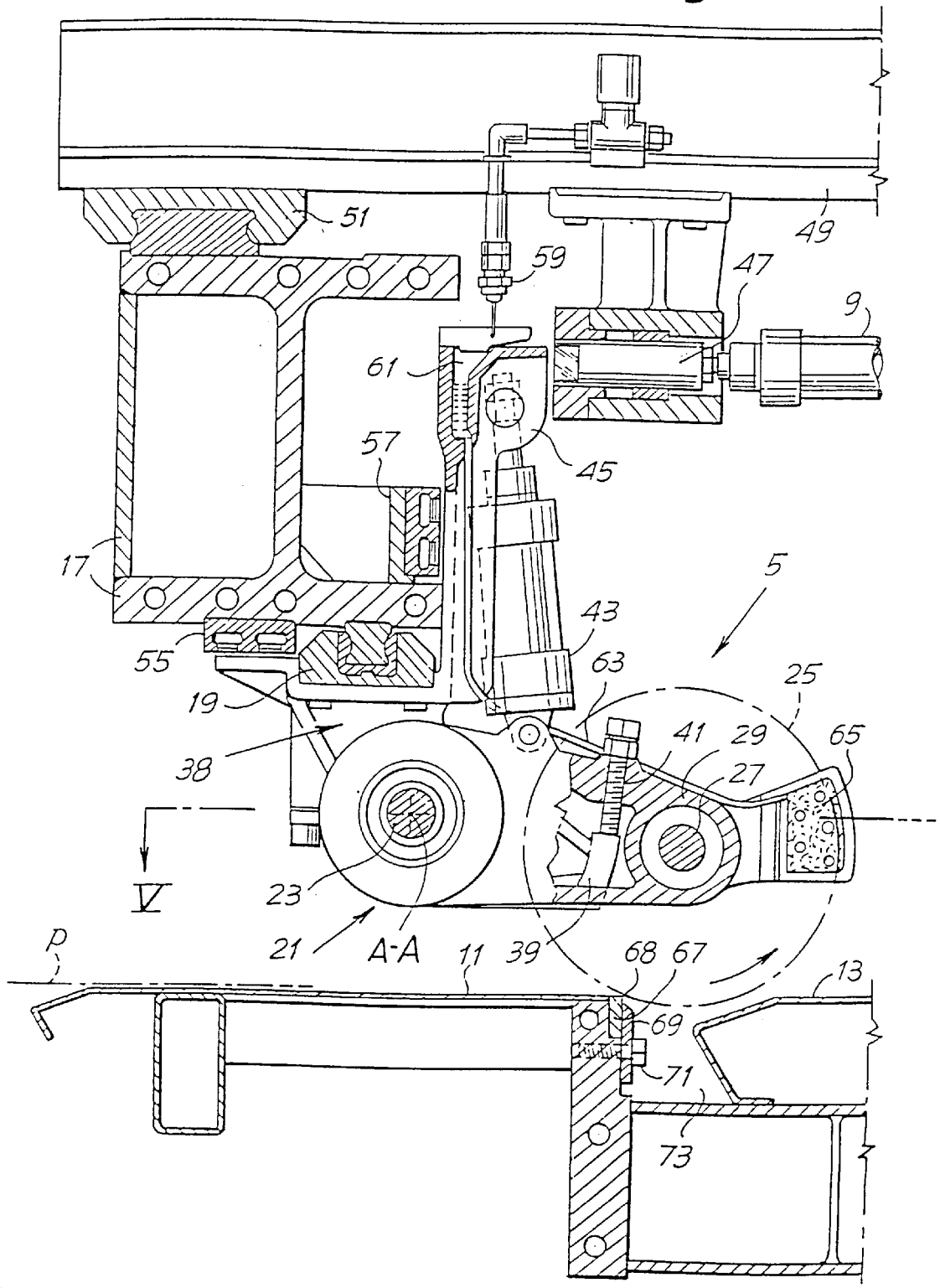
FIG. 4 shows a detail of one of the slitting stations of the machine shown in FIG. 3.

The pivoting of the arm 29 is controlled by a piston/cylinder actuator 43 in which the cylinder is hinged to the pivoting arm 29, while the end of the piston rod is hinged to an upright 45 belonging to the moving bracket 38. The piston/cylinder actuator 43 moves its pivoting arm 29 back and forth between a working (or slitting) position, shown in FIG. 4, in which the stop 41 is in contact with the bearing surface of the extension 39, and a nonworking (or inactive) position shown in FIG. 3 in respect of the arm 29B of the second slitting station 7.

Each slitting unit 21 is positioned along the track 19 by means of a manipulator 47 carried by a carriage 49 traveling along rails 51, 51B on the crossbeams 17 and 17B of the two slitting stations 5 and 7. Once in the working position, the unit 21 is immobilized by pneumatic immobilizing systems 55, 57 or the like.

The carriage 49 carries, in addition to the manipulator 47, a dispenser 59 of a lubricating substance which is dispensed into a funnel-shaped reservoir 61. Said reservoir 61 is connected by a hose 63 leading to a pair of lubricating felts 65 defining a gap between themselves in which the slitting tool 25 runs. The lubricating substance in the reservoir 61 can be topped up, e.g. every time the slitting unit 21 is positioned, or more frequently, e.g. in proportion to how much web has been slit.

The carriage 49 also carries a manipulator 47B for positioning the slitting units 21B of the second station 7, as well as a dispenser 59B supplying the lubricating substance to the pairs of lubricating felts of the slitting tools 25B of the various slitting units 21B.

Below the slitting tools 25 of the slitting station 5, underneath the path P of the web N, is a rectangular-sectioned bar 67 arranged such that one of its edges 68 lies in the plane of travel defined by the surface 11. The bar 67 is locked in a seat by a clamping batten 69 and screw means 71 for easy replacement of the bar, or for modifying its position in such a way that the four edges of the bar are positioned along the travel surface 11 in succession.

As the above account makes clear, the various slitting units 21 of station 5 and 21B of station 7 can be controlled independently of one another by the actuators 43. This makes it possible to raise the tools at different times during the changeover between jobs.

Downstream of the slitting stations 5 and 7 the path P of the web subdivided into lengthwise strips divides into two paths PA and PB, along which are located respective crosswise shears 20A, 20B, arranged at two different levels, for cutting the lengthwise strips into sheets FA and FB, illustrated by way of indication downstream of the cutters 20A, 20B.

Figure 1:
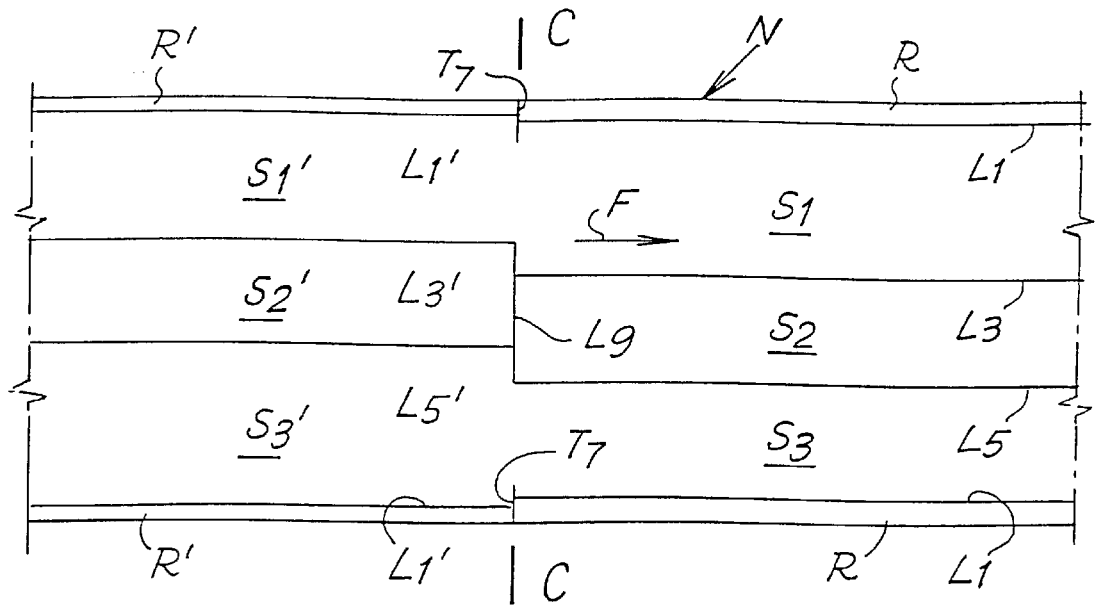
FIGS. 1 and 2 (already described) show the zone of transition between a previous job and a subsequent job using known methods.
Figure 2:
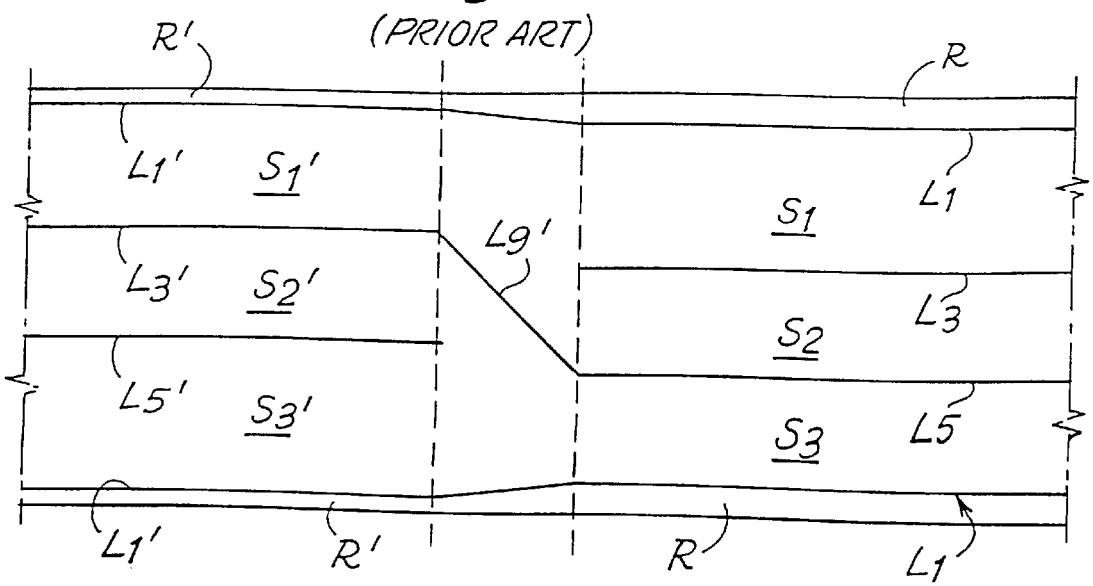
Figure 6:
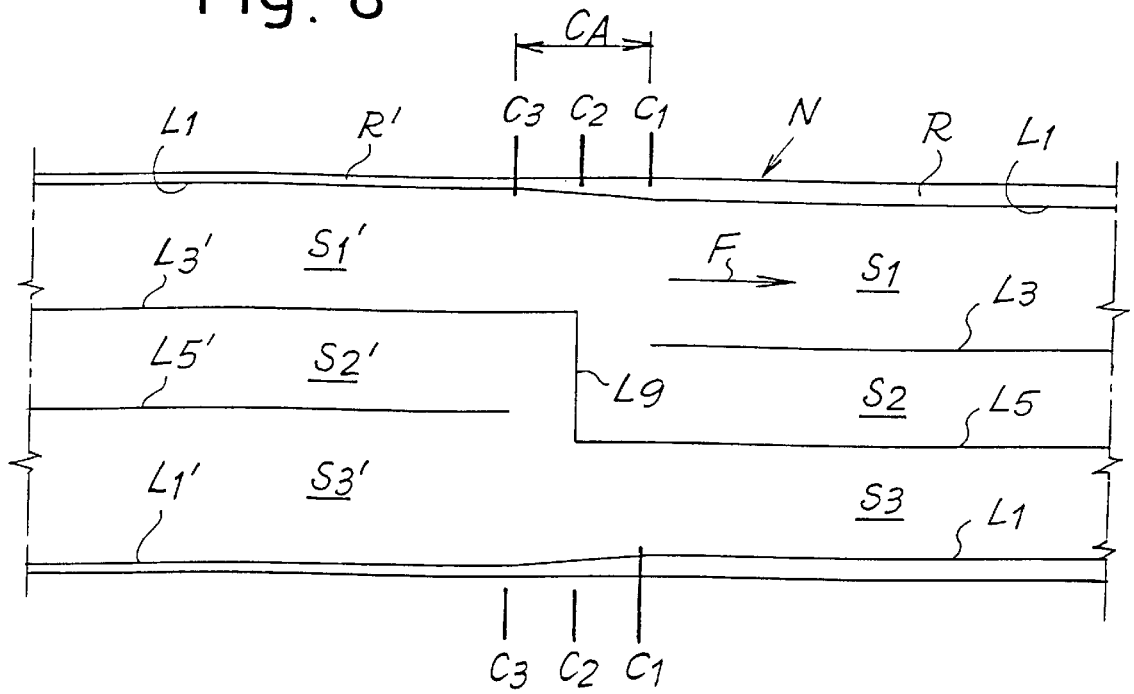
FIG. 6 is a top view of the job changeover zone of the web.

With reference to FIGS. 5 and 6, the procedure followed at the time at which the job changeover is carried out will now be described. In FIG. 6 the same reference numerals as in FIGS. 1 and 2, already described, are used for identical or corresponding parts. The slit lines L3 and L5 are made by the two slitting tools 25 of the two slitting units 21 seen in FIG. 5. When the job changeover is to be carried out, and the dimensions of the lengthwise strips cut from the web N are to be changed from those of strips S1, S2, S3 to those of strips S1', S2', S3', the tool 25 generating the slit line L3 (that is the upper tool in FIG. 5) is raised to interrupt the slitting of the web N upon arrival of section C1—C1, while the tool 25 generating the slit line L5 is kept engaged longer in the web (in the slitting position) and is removed from said web (into the inactive position) to interrupt the slit line L5 upon arrival of section C2—C2.

The tool 25B of station 7 shown at the top in FIG. 5 is moved into the slitting position ahead of the other tool 25B so as to engage in the web and thus commence forming the slit line L3' at section C2—C2, that is to say before section C3—C3 where the second tool 25B penetrates the web N and begins to slit line L5'.

Between sections C1—C1 and C3—C3 a changeover zone CA is thus created between the strips S1, S2, S3 of the previous job and the strips S1', S2', S3' of the job following.

Figure 7:
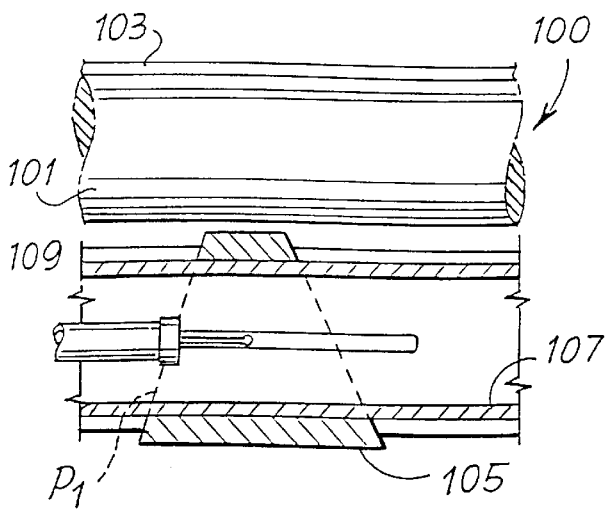
FIG. 7 shows a front view and partial cross section, on VII—VII as marked in FIG. 8, of the auxiliary cutter that makes the joining slit.
Figure 8:
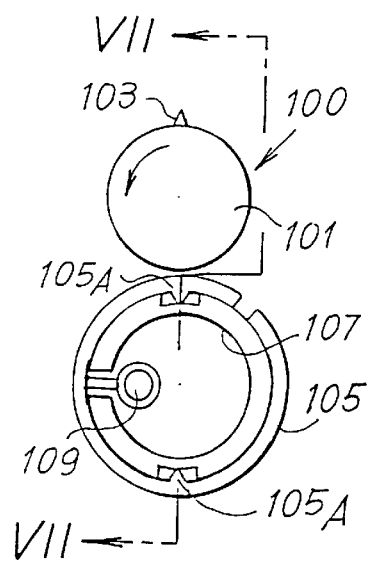
FIG. 8 shows a side view and partial cross section of the auxiliary cutter.
Figure 9:
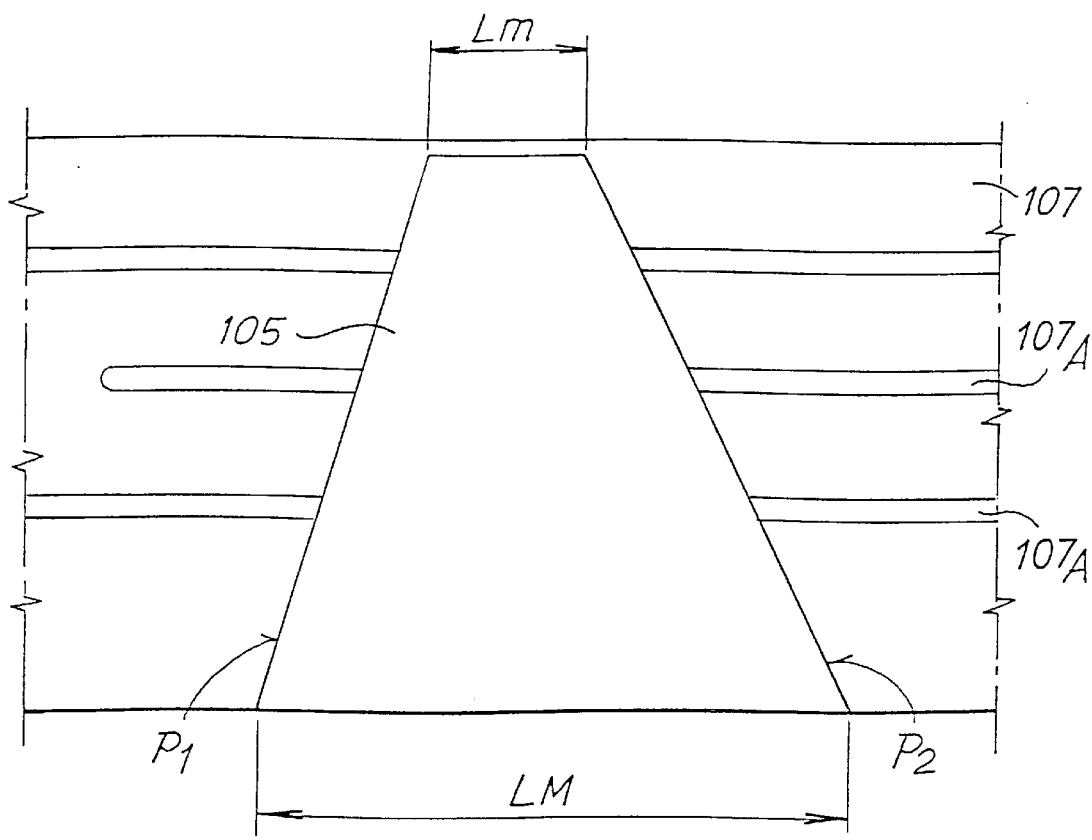
FIG. 9 shows a planar development of the cylindrical shell of the opposing roller of the auxiliary cutter.

Downstream of the slitting stations 5, 7 is an auxiliary shear having the general reference 100 and described in greater detail below with reference to FIGS. 7–9, which generates the joining slit line L9. In the example shown in the drawing the slit L9 is at 90° to the direction F of forward travel of the web N, but a different inclination is not ruled out, for example by using a helical blade.

As seen clearly in FIG. 6, in the transition zone CA between the previous job and the job following there is no complete slitting of any of the strips S1, S2, S3, S1', S2', S3', which means that these can be guided successfully and reliably toward shears 20A, 20B for the cutting of the sheets of web, without the risk of the web skidding or jamming in the machine.

In practice each slitting station 5, 7 may of course comprise a greater number of slitting tools, even though the example illustrated is limited, for simplicity, to two tools besides those (not shown) that do the trimming cutting.

The slit lines L1, L1' for producing the trimmings can be made by slitting tools 25 or in some other suitable way, by one of the known methods. In the example illustrated, furthermore, the trimmings R, R' and their respective slit lines L1, L1' are shown as continuous. This can be produced as described in, for example, EP-A-0,737,553. However, in order among other things to entirely do away with the use of water jets, the trimmings can be generated by rotating slitting tools 25 and in the job changeover zone short transverse cuts similar to the cuts T7 shown in FIG. 1 can be made by means known per se. Tools rotating about a horizontal axis and pivoting about a vertical axis may also be used to produce a continuous trimming.

The transverse joining slit L9 may be of variable length and in addition its position along the transverse breadth of the web N is not fixed. Both its length and its position depend on the number and dimensions of the strips S into which the web is divided, as also on the position of the slit line separating the strips to be conveyed to shear 20A from those to be conveyed to shear 20B.

In order to enable the transverse joining slit line L9 to be generated in a variable position and with a variable length, a variety of different systems can be used, some of which are described in the publications referred to earlier. FIGS. 8, and 9 show a different solution to this problem. The shear 100 is set up, in the example illustrated, downstream of the slitter/scorer unit 1, 3, 5, 7. However, it should be understood that it may also be set up upstream of this unit, in which case it will form the slit in the as-yet unslit web N, that is to say before it is divided into strips S1, S2, S3, S1', S2', S3'.

The shear 100 comprises a cylinder 101 with a longitudinal blade 103 running along a generatrix of the cylinder 1. The blade 103 acts in combination with a specially shaped opposing roller 105 carried by a supporting cylinder 107.

The opposing roller 105 can be made of a compliant material such as expanded resin and takes the form of a sleeve (cp. FIG. 8 in particular) bounded by an external cylindrical surface and by two inclined planes P1, P2. The sleeve 105 assumes, in planar development, the trapezoidal form shown in FIG. 9. It is mounted slidably on the external surface of the supporting cylinder 107 and is connected to an actuator 109 (in the example a piston/cylinder actuator) that controls its translational movement along the axis of the cylinder 107 to position it in the correct position along the length of the supporting cylinder 107. The axial movement of translation is guided by two channels 107A in which two ribs 105A of the shell 105 are engaged.

The supporting cylinder 107 is able to rotate about its own axis in order to adjust the angular position of the sleeve 105. By this means the blade 103 can be set to engage with any section of the sleeve 105 so that it is possible to produce a slit L9 of variable length between the minimum length Lm and the maximum length LM (cp. FIG. 9).

This gives the possibility of positioning the joining slit line L9 and varying its length to suit changing requirements.

The cylinder 101 supporting the blade 103 makes one revolution each time there is a change of job in order to generate the slit L9, and during the slit the supporting cylinder 107 and its sleeve 105 also turn, in the opposite direction to the direction of rotation of cylinder 101. The initial position of the supporting cylinder 107 and hence of the sleeve 105 is adjusted so that the contact between the blade 103 and the sleeve 105 occurs on the generatrix of the sleeve 105 whose length is equal to the desired length of the slit line L9 to be generated. The slit is generated only where the blade 103 and sleeve 105 contact each other, since in the adjacent regions the web has no support from underneath and is therefore not slit.

It will be understood that the drawing shows only an example purely as a practical demonstration of the invention, which latter can be varied as regards shapes and arrangements without thereby departing from the scope of the concept underlying said invention. The presence of any reference number in the appended claims is for the purpose of facilitating the reading of the claims with reference to the description and drawings and does not limit the scope of protection represented by the claims.

I claim:

1. A device for lengthwise slitting a web fed in a direction of forward travel, the device comprising:
   a first series and a second series of slitting tools for slitting said web along lengthwise slit lines;
   control means for moving said slitting tools of said first series and said second series alternately between a slitting position and an inactive position, the tools of one of said first series or said second series being in the slitting position while the tools of the other series are in the inactive position, and vice versa, said control means operable to modify positions of the slitting tools; and
   an auxiliary slitting means for generating a joining slit not parallel to the direction of forward travel of the web in a job changeover zone between a previous job and a following job;
   wherein at least some of the slitting tools of said first series and said second series of slitting tools can be moved from said slitting position to said inactive position, and vice versa, independently of other tools of a same series, and
   wherein said control means delays movement of one slitting tool belonging to the tools temporarily in the slitting position from said slitting position to the inactive position, and advances movement of one slitting tool belonging to the tools temporarily in the inactive position, from the inactive position to the slitting position, to extend a lengthwise slit line from the previous job and a lengthwise slit line for the following job into the job changeover zone, said auxiliary slitting means joining up each extended slit line by means of said joining slit.

2. The device as claimed in claim 1, wherein said auxiliary slitting means generates a joining slit oriented approximately perpendicularly to the direction of forward travel of the web.

3. The device as claimed in claim 1, wherein said slitting tools are carried by pivoting arms.

4. The device as claimed in claim 3, wherein each pivoting arm is connected to an actuator that controls pivoting of said arm.

5. The device as claimed in claim 1, wherein said auxiliary slitting means comprises a slitting blade and an opposing roller, said opposing roller having an adjustable length and position.

6. The device as claimed in claim 5, wherein said opposing roller includes a movable sleeve that can be positioned axially along a supporting cylinder.

7. The device as claimed in claim 6, wherein said sleeve has a cylindrical surface of variable length around circumferential development of the sleeve and said supporting cylinder is angularly positionable.

8. The device as claimed in claim 1, further comprising scoring tools.

9. A method for changing between jobs in a device for slitting a web into a plurality of lengthwise strips with a series of slitting tools, the method comprising:
   generating a job changeover zone between a previous job processed by a first series of slitting tools and a following job processed by a second series of slitting tools;
   moving the tools of the first series of tools from a slitting position to an inactive position and the tools of the second series from an inactive position to a slitting position;
   wherein movement from the slitting position to the inactive position of one of the slitting tools of the first series is delayed so that the movement takes place after movement of other tools of said first series, and movement from the inactive position to the slitting position of one of the slitting tools of the second series is advanced so that the movement takes place before that of other tools of said second series, thus generating two extended slit lines that extend into said job changeover zone; and
   generating a joining slit in said job changeover zone to join up said two extended slit lines.

10. The method as claimed in claim 9, wherein said joining slit is perpendicular to a direction of forward travel of said web.

11. A device for lengthwise slitting a web fed in a direction of forward travel, the device operable to change slitting of the web from a first format to a second format, the device comprising:

a first series and a second series of slitting tools for slitting said web along lengthwise slit lines;

a controller for moving said slitting tools of said first series and said second series alternately between a slitting position and an inactive position, the tools of one of said first series or said second series being in the slitting position while the tools of the other series are in the inactive position, and vice versa, the controller operable to modify positioning of the slitting tools to change the slitting of the web from the first format to the second format; and an auxiliary slitter for generating a joining slit transverse to the direction of forward travel of the web in a job changeover zone between a previous job where the web is slit in the first format and a following job where the web is slit in the second format;

wherein at least some of the slitting tools of said first series and said second series of slitting tools can be moved from said slitting position to said inactive position, and vice versa, independently of other tools in a same series, the controller delaying movement of one slitting tool of the tools in the slitting position from the slitting position to the inactive position to extend one lengthwise slit line from the previous job and advancing movement of one slitting tool of the tools in the inactive position from the inactive position to the slitting position to extend one lengthwise slit line from the following job, and the joining slit generated by the auxiliary slitter joining each said lengthwise slit line extended.

12. A method for changing between jobs in a device for generating a plurality of slits in a web, the method comprising:

moving tools of a first series of slitting tools from a slitting position to an inactive position;

moving tools of a second series of slitting tools from an inactive position to a slitting position;

generating a job changeover zone between a previous job processed by said first series of slitting tools and a following job processed by said second series of slitting tools;

delaying movement of one of the slitting tools of the first series from the slitting position to the inactive position to extend one of the plurality of slits into the job changeover zone;

advancing movement of one of the slitting tools of the second series from the inactive position to the slitting position to extend another one of the plurality of slits into the job changeover zone; and generating a joining slit in said job changeover zone to join the slits extended.

* * * * *